(12) United States Patent
Scherzinger et al.

(10) Patent No.: US 7,598,642 B2
(45) Date of Patent: Oct. 6, 2009

(54) AXIAL IMPACT LINER

(75) Inventors: William Scherzinger, Oro Valley, AZ (US); Wayne T. Pearson, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 70 days.

(21) Appl. No.: 11/869,567

(22) Filed: Oct. 9, 2007

(65) Prior Publication Data

US 2009/0091201 A1 Apr. 9, 2009

(51) Int. Cl.
*H02K 5/16* (2006.01)
(52) U.S. Cl. .......................................... 310/90; 310/91
(58) Field of Classification Search ............. 310/90, 310/67 R, 91; 384/517
See application file for complete search history.

(56) References Cited

U.S. PATENT DOCUMENTS

| 6,260,667 | B1 | 7/2001 | Sugden | |
|---|---|---|---|---|
| 6,617,740 | B2 * | 9/2003 | Petersen | 310/216 |
| 6,664,694 | B2 | 12/2003 | Yang | |
| 7,259,492 | B2 | 8/2007 | Yang | |
| 2003/0006659 | A1 * | 1/2003 | Yeh | 310/90 |

\* cited by examiner

*Primary Examiner*—Dang D Le
(74) *Attorney, Agent, or Firm*—Oral Caglar, Esq.

(57) ABSTRACT

An axial impact liner comprises a bearing liner having a shear member and a pocket. A spring and a supply of oil may be included within the pocket. In the event of an axial load, such as from a bearing or main rotor failure, the axial impact liner can shear in the axial direction and absorb the energy of the axial load by forcing the shear member into the oil filled pocket and against the spring. The pocket comprises a volume capable of accommodating the full axial distance that the rotor could move.

19 Claims, 3 Drawing Sheets

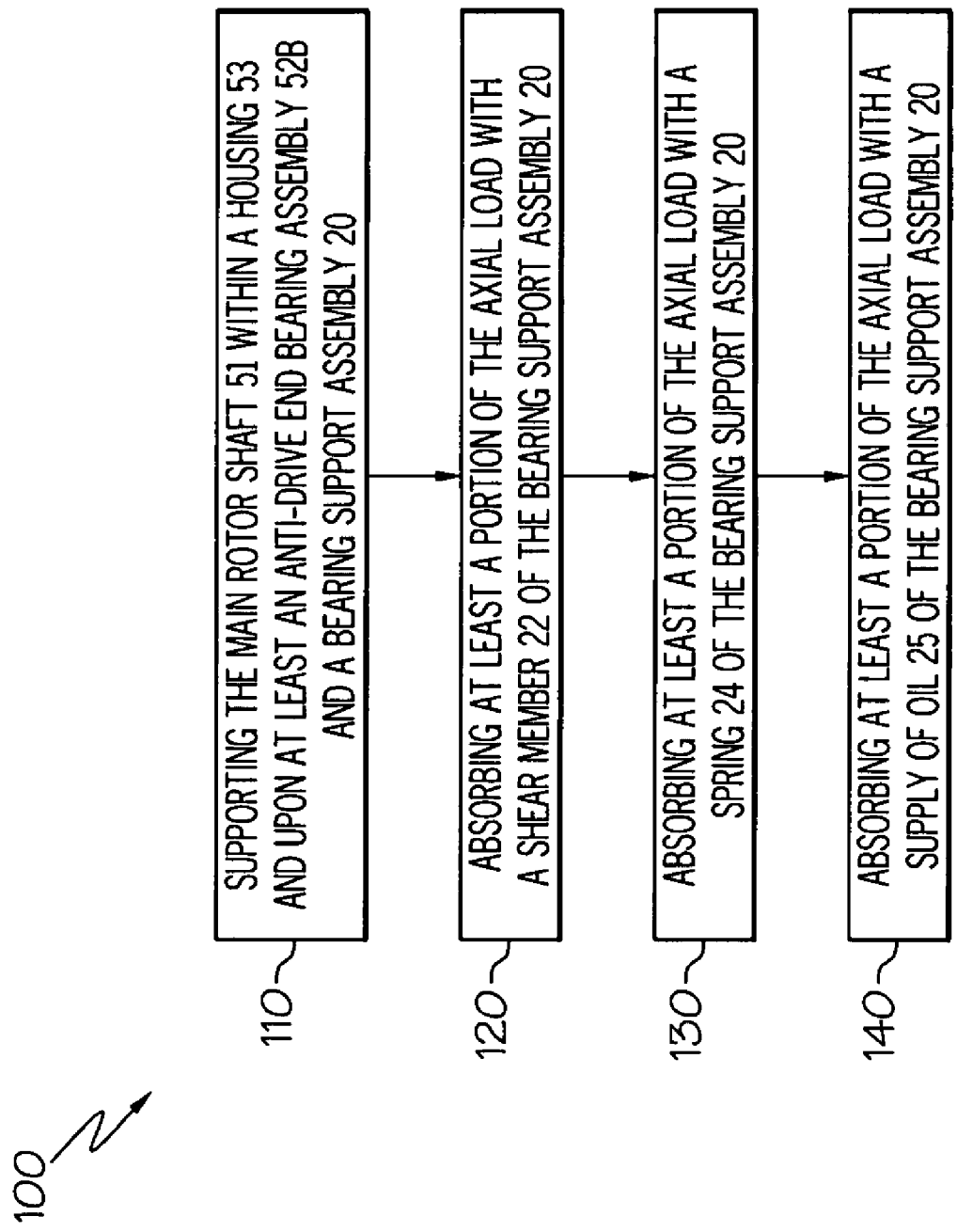

AXIAL IMPACT LINER

BACKGROUND OF THE INVENTION

The present invention generally relates to electrical machines, such as high speed aerospace generators and motors, and, more particularly, to systems for containment of a high speed generator rotor during a bearing, main rotor or similar failure.

Aircraft systems include various types of rotating electrical machines, such as alternating current (AC) motors and generators of various designs. Generally, the electrical machine includes a rotor and a stator. The rotor is part of a rotating shaft assembly supported by bearings. The stator is part of a static assembly that supports the rotor.

If the machine is operated as a motor, electrical power may be supplied to the stator to develop a rotating electrical field. This rotating electrical field generates a torque in the rotor causing it to rotate. If the machine is operated as a generator, electrical power may be supplied to the rotor to generate a magnetic field. The generated magnetic field rotates as the rotor rotates. This rotating magnetic field induces a voltage across the stator, which supplies electrical power to a load.

For high speed aerospace generators, the operating speed range is typically 7,200 to 30,000 rpm. Potentially large centrifugal forces can be imposed on the rotors of generators operating at such speeds and may result in rotor failure. Additionally, the bearings, which may have very high stiffness and little damping, may fail due to, for example, an unbalanced rotor rotating for prolonged periods of time. During a bearing, main rotor or related failure, excessive axial forces may be produced between the rotor and stator which may lead to uncontained failure of the stator housing.

In U.S. Pat. No. 6,260,667, a rotor containment brake is disclosed. The described rotor containment brake is designed to operate in the delay between the occurrence of bearing failure and the disconnection of the rotor shaft from the driving source. The described brake includes a cylindrical support connected to the housing and extending into a hollow in the anti-drive end of the rotor shaft, a carrier plate connected to the support and extending radially from the support towards the rotor shaft, a screw thread provided on the support, and a threaded plate mounted on the screw thread, the threaded plate extending radially from the support towards the rotor shaft and being spaced from the carrier plate. Rotation of the threaded plate about the support causes the threaded plate to move towards the carrier plate, pressing the plate member of the rotor between the carrier plate and the threaded plate, thereby applying braking force thereto. In the described system, upon a bearing failure, a braking force is applied to the rotor shaft responsive to the bearing failure. Although, the '667 patent addresses rotor containment in the event of bearing failure, it does not address rotor containment in the event of main rotor or other failures that may result in axial forces. Additionally, the described system requires carrier plates and threaded plates that may not be suitable for all applications. Further, manufacturing time and cost may be increased by the installation of carrier plates and threaded plates.

As can be seen, there is a need for containment of the high speed generator rotor during a bearing or main rotor or related failure that results in excessive axial force. There is a need for an improved system to prevent a catastrophic uncontained failure.

SUMMARY OF THE INVENTION

In one aspect of the present invention, a system for an electrical machine comprises a liner member having an inner diameter surface; a shear member extending radially inward from the inner diameter surface; and a pocket at least partially defined by the liner member and the shear member.

In another aspect of the present invention, a system for an electrical machine comprises a cylindrical structure; a shear member extending from an inner diameter surface of the cylindrical structure and towards a main rotor shaft of the electrical machine; a pocket to adjacent the shear member; and a spring positioned within the pocket.

In a further aspect of the present invention, a system for a bearing support assembly comprises a cylindrical portion; an end portion integral to and positioned at one end of the cylindrical portion; a shear member extending radially inward from the cylindrical portion; a pocket defined at least in part by the cylindrical portion, the end portion and the shear member; and a supply of oil disposed in the pocket.

These and other features, aspects and advantages of the present invention will become better understood with reference to the following drawings, description and claims.

BRIEF DESCRIPTION OF THE DRAWINGS

FIG. 3 is a flow chart of a method for containing a main rotor shaft having an axial load according to an embodiment of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides rotor containment assemblies for rotors of electrical machines, such as high speed aerospace generators, and methods for containing rotors. Embodiments of the present invention may be positioned between the bearing assemblies and the support housing of the electrical machines. In one embodiment, the present invention may comprise a bearing liner having an axial shear member and a pocket. A spring and a supply of oil may be included within the pocket. In the event of a large axial load the bearing liner can shear in the axial direction and absorb the energy of the axial load by forcing the shear member into the oil filled pocket and against the spring. The pocket may comprise a volume capable of accommodating the full axial distance that the rotor could move. Embodiments of the present invention may find beneficial use in many industries including aerospace, automotive, and commercial power generation. Embodiments of the present invention may be beneficial in applications including various types of rotating electrical machines for aircraft such as, for example, generators, motors, and motor/generators. Embodiments of the present invention may be useful in any electrical machine application.

Unlike the prior art that includes carrier plates and threaded plates, an embodiment of the present invention may comprise a bearing liner having a shear member and a pocket. Unlike the prior art that is designed to stop the rotation of the rotor, embodiments of the present invention can absorb an axial load and halt the axial momentum of the rotor.

Figure 1:
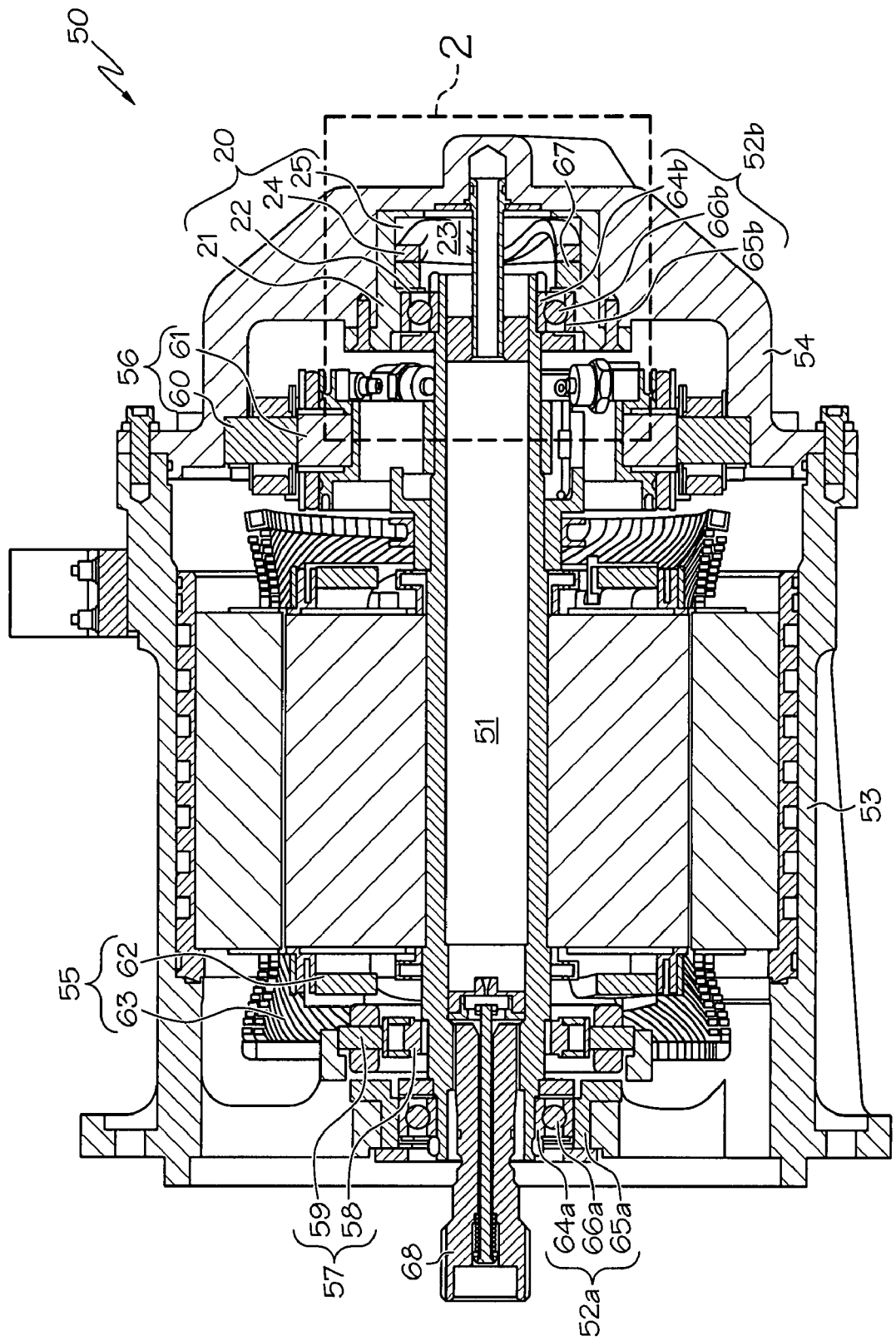
FIG. 1 is a cross-section view of a generator according to one embodiment of the present invention.

In one embodiment, the present invention may comprise a bearing support assembly 20 for an electrical machine, such as but not limited to a generator 50, as depicted in FIG. 1. The generator 50 may comprise a wound rotor generator and may include a main rotor shaft 51, two bearing assemblies—a drive end bearing assembly 52a and an anti-drive end bearing assembly 52b—and a housing 53. The housing 53 may include an end bell 54. The main rotor shaft 51 may be positioned between and in contact with the drive end bearing assembly 52a and the anti-drive end bearing assembly 52b. The main rotor shaft 51, the drive end bearing assembly 52a and the anti-drive end bearing assembly 52b may be disposed within the housing 53.

The generator 50 may include a main generator 55, an exciter generator 56, and a permanent magnet generator (PMG) 57 positioned along the main rotor shaft 51. The main rotor shaft 51 may be operationally connected to a drive shaft 68. The main generator 55 may be positioned between the PMG 57 and the exciter generator 56, as depicted in FIG. 1. Alternatively, the exciter generator 56 may be positioned between the main generator 55 and the PMG 57 (not depicted).

Magnets (not depicted) may be included on a PMG rotor 58 of the PMG 57. When the PMG rotor 58 rotates, AC currents may be induced in PMG stator windings 59 of the PMG 57. These AC currents may be fed to a regulator or a control device (not shown), which in turn outputs a current. This current may be provided to exciter stator windings 60 of the exciter generator 56. As an exciter rotor 61 of the exciter generator 56 rotates, three phases of AC current may be induced in the windings of the exciter rotor 61. Rectifier circuits that rotate with the exciter rotor 61 may rectify this three-phase AC current, and the resulting DC currents may be provided to main rotor windings 62 of the main generator 55. Finally, as the wound rotor laminated core (main rotor windings 62) of the main generator 55 rotates, three phases of AC current may be typically induced in main stator windings 63, and this three-phase AC output can then be provided to a load such as, for example, electrical aircraft systems.

The drive end bearing assembly 52a and the anti-drive end bearing assembly 52b may support the main rotor shaft 51, as depicted in FIG. 1. The drive end bearing assembly 52a may comprise an inner race 64a, an outer race 65a and a rolling element 66a. The anti-drive end bearing assembly 52b may comprise an inner race 64b, an outer race 65b and a rolling element 66b. The rolling elements 66a, 66b may comprise conventional rolling elements, such as balls, rollers etc. A load plate 67 may be included for ease of bearing support assembly installation. The inner race 64a, 64b may be fixed with the main rotor shaft 51. The outer race 65a of the drive end bearing assembly 52a may be adjacent to the housing 53. The outer race 65b of the anti-drive end bearing assembly 52b may be adjacent to a liner member 21 (discussed below) of the bearing support assembly 20.

The bearing support assembly 20 may be positioned radially outward from the bearing assembly 52 and radially inward from the housing 53. The bearing support assembly 20 may be positioned at the interface between the end bell 54 of the housing 53 and the anti-drive end bearing assembly 52b.

The bearing support assembly 20 may comprise the liner member 21, a shear feature (shear member 22), a pocket 23, a spring 24 and a supply of oil 25, as depicted in FIG. 1. For these embodiments, the axial load may be absorbed by the shear member 22, the spring 24 and the oil 25. For some embodiments (not depicted), the bearing support assembly 20 may comprise the liner member 21, the shear member 22, the pocket 23 and the supply of oil 25. For these embodiments, the axial load may be absorbed by the shear member 22 and the oil 25. For some embodiments (not depicted), the bearing support assembly 20 may comprise the liner member 21, the shear member 22, the pocket 23 and the spring 24. For these embodiments, the axial load may be absorbed by the shear member 22 and the spring 24. For some embodiments (not depicted), the bearing support assembly 20 may comprise the liner member 21, the shear member 22, and the pocket 23. For these embodiments, the axial load may be absorbed by the shear member 22.

Figure 2:
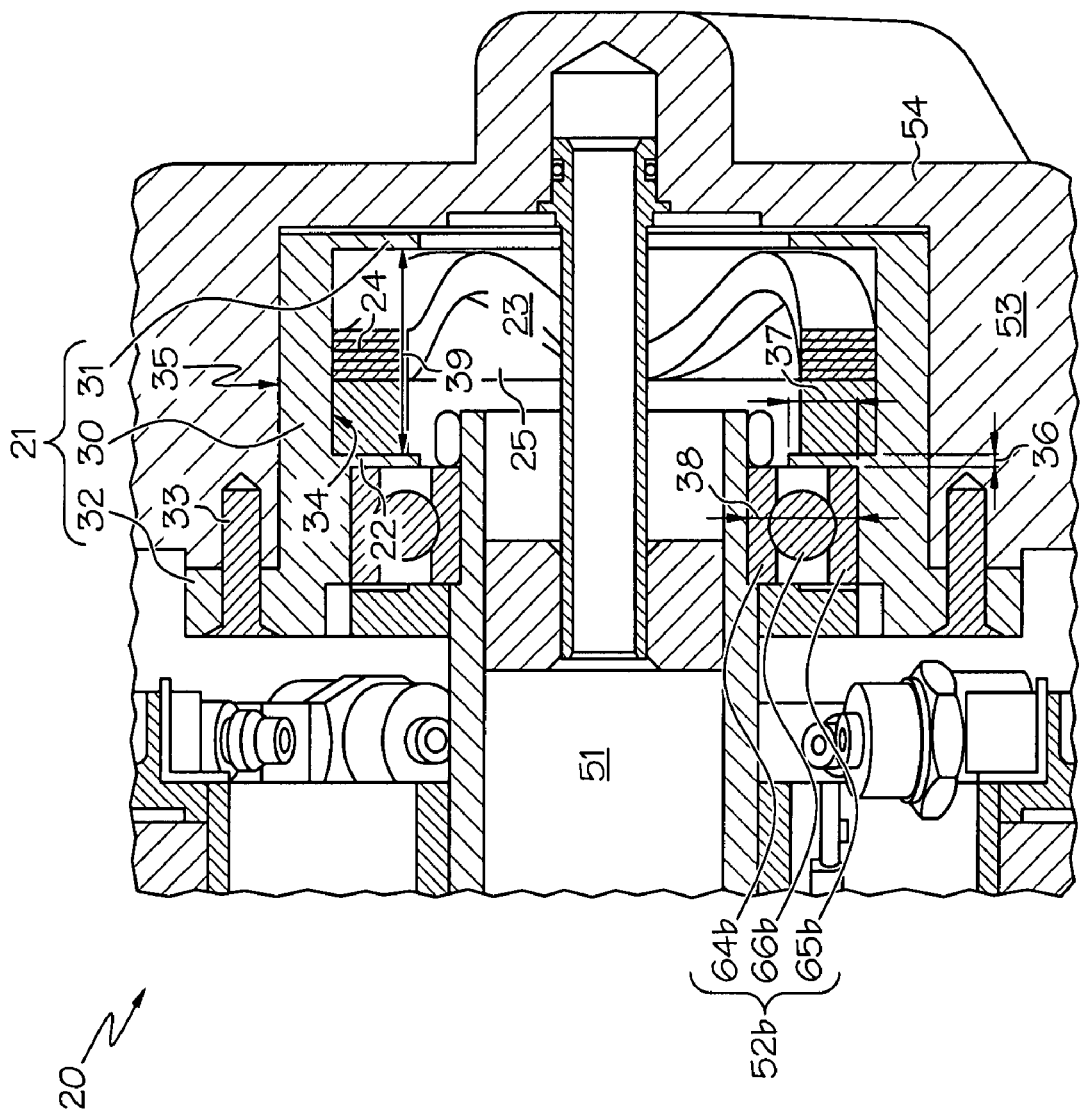
FIG. 2 is a close-up view of area 2 of FIG. 1.

The liner member 21, as depicted in FIG. 2, may include a cylindrical portion 30, an end portion 31 and a flange portion 32. The cylindrical portion 30 may comprise a cylindrically shaped structure. The end portion 31 may be integral to and positioned at one end of the cylindrical portion 30. The end portion 31 may extend radially inward from the cylindrical portion 30. The flange portion 32 may be integral to and positioned at the other end of the cylindrical portion 30. The flange portion 32 may extend radially outward from the cylindrical portion 30. The flange portion 32 may be fixed to the housing 53 by, for example, a bolt 33.

The liner member 21 may have an inner diameter surface 34 and an outer diameter surface 35. The inner diameter surface 34 may be the surface of the cylindrical portion 30 that faces towards the bearing assembly 52b. The outer diameter surface 35 may be the surface of the cylindrical portion 30 that faces away from the bearing assembly 52 and towards the housing 53. The liner member 21 may positioned such that the inner diameter surface 34 is adjacent the outer race 65b of the anti-drive end bearing assembly 52b.

The shear member 22, as depicted in FIGS. 1 and 2, may be an annular plate shaped structure. The shear member 22 may extend radially inward from the inner diameter surface 34 of the liner member 21. The shear member 22 may extend from the inner diameter surface 32 of the liner member 21 and towards the main rotor shaft 51. The shear member 22 may be integral to the liner member 21. Alternatively, the shear member 22 may be connected to the liner member 21 by means such as brazing or welding.

The shear member 22 may be designed to shear from the liner member 21 when the shear member 22 is exposed to an axial force. Bearing failure or main rotor failure may provide the axial force and may urge the main rotor shaft 51, along with the anti-drive end bearing assembly 52b, axially towards the shear member 22. The shear member 22 may be designed to shear from the liner member 21 when impacted by the anti-drive end bearing assembly 52b or the main rotor shaft 51. A portion of the axial force may be absorbed by the shear member 22. The shearing of the shear member 22 may absorb a portion of the axial force and the urging of the shear member 22 into the pocket 23 may absorb a portion of the axial force.

The dimensions of the shear member 22 may vary with application and may depend on factors including the dimensions of the bearing assembly 52, the mass of the main rotor shaft 51, the axial load in normal operation and the axial load under failure conditions. A shear member axial thickness 36 (see FIG. 2) and a shear member radial length 37 (see FIG. 2) of the shear member 22 may be factors in determining the axial force necessary to shear the shear member 22 from the liner member 21. For some embodiments, the shear member 22 may have an axial thickness 36 of between about 0.010 inches and about 0.100 inches. For some embodiments, the shear member 22 may have a radial length 37 of between about 0.032 inches and about 0.250 inches. For some embodiments, the shear member radial length 37 may be at least about half a bearing assembly radial width 38 (see FIG. 2).

The pocket 23 may comprise void and may be defined at least in part by the shear member 22 and the liner member 21. The pocket 23 may be adjacent to the shear member 22. The pocket 23 may comprises a volume capable of accommodating the full axial distance that the main rotor shaft 51 could move. The dimensions of the pocket 23 may vary with application and may depend on factors including the dimensions of the bearing assembly 52 and the main rotor shaft 51. A pocket axial depth 39 (see FIG. 2) of the pocket 23 may be a length measured from the shear member 22 to the end portion 31 of the liner member 21. The axial depth 39 of the pocket 23 may vary with application and may depend on factors including the mass the main rotor shaft 51 and the magnitude of the axial force that would be provided by a bearing failure of main rotor failure. For some embodiments, the pocket 23 may have an axial depth 39 of between about 0.250 inches and about 1.500 inches.

The spring 24 may be positioned within the pocket 23. The spring 24 may comprise a wavy washer type spring, as depicted. For some embodiments, other types of springs 24, such as coil springs, may be used in lieu of wavy washer springs. During bearing or rotor failure, the spring 24 may absorb at least a portion of the axial load as the shear member 22 is forced into the pocket 23.

The supply of oil 25 may be positioned within the pocket 23. The supply of oil 25 may be a pressurized supply of oil from the cooling system of the generator 50. During bearing or rotor failure, the supply of oil 25 may absorb at least a portion of the axial load as the shear member 22 is forced into the pocket 23.

A method 100 for containing a main rotor shaft 51 having an axial load is depicted in FIG. 3. The method 100 may comprise a step 110 of supporting the main rotor shaft 51 within a housing 53 and upon at least an anti-drive end bearing assembly 52b and a bearing support assembly 20; a step 120 of absorbing at least a portion of the axial load with a shear member 22 of the bearing support assembly 20; a step 130 of absorbing at least a portion of the axial load with a spring 24 of the bearing support assembly 20; and a step 140 of absorbing at least a portion of the axial load with a supply of oil 25 of the bearing support assembly 20.

The step 110 of supporting the main rotor shaft 51 within a housing 53 and upon at least an anti-drive end bearing assembly 52b and a bearing support assembly 20 may comprise positioning the anti-dive end bearing assembly 52b within a liner member 21 of the bearing support assembly 20 and fixing a flange portion 32 of the liner member 21 to the housing 53. The step 110 of supporting the main rotor shaft 51 within a housing 53 and upon at least an anti-drive end bearing assembly 52b and a bearing support assembly 20 may include providing a clearance to accommodate the maximum axial movement the main rotor shaft 51 can shift in the event of a failure.

The step 120 of absorbing at least a portion of the axial load with a shear member 22 of the bearing support assembly 20 may comprise absorbing a portion of the axial load by shearing the shear member 22. The step 120 of absorbing at least a portion of the axial load with a shear member 22 of the bearing support assembly 20 may comprise absorbing a portion of the axial load by urging the shear member 22 into a pocket 23 of the bearing support assembly 20. For some embodiments, the step 120 of absorbing at least a portion of the axial load with a shear member 22 of the bearing support assembly 20 may comprise absorbing essentially all of the axial load with the shear member 22.

The step 130 of absorbing at least a portion of the axial load with a spring 24 of the bearing support assembly 20 may comprise absorbing a portion of the axial load by at least partially compressing the spring 24. Some embodiments may not include the step 130 of absorbing at least a portion of the axial load with a spring 24.

The step 140 of absorbing at least a portion of the axial load with a supply of oil 25 of the bearing support assembly 20 may comprise absorbing a portion of the axial load by urging the shear member 22 into the supply of oil 25. Some embodiments may not include the step 140 of absorbing at least a portion of the axial load with a supply of oil 25.

As can be appreciated by those skilled in the art, embodiments of the present invention provide improved rotor containment systems for high speed aerospace generators. Embodiments of the present invention provide axial impact liners that can prevent a catastrophic uncontained failure. Embodiments of the present invention provide rotor containment systems that can absorb an axial load during bearing, main rotor or related failures.

It should be understood, of course, that the foregoing relates to exemplary embodiments of the invention and that modifications may be made without departing from the spirit and scope of the invention as set forth in the following claims.

We claim:

1. A system for an electrical machine comprising:
a liner member having an inner diameter surface;
a shear member extending radially inward from said inner diameter surface, said shear member shearing from said liner member when said shear member is exposed to an axial force from a main rotor shaft; and
a pocket at least partially defined by said liner member and said shear member.

2. The system of claim 1, further comprising a spring positioned within said pocket, the spring positioned to absorb said axial force from said main rotor shaft.

3. The system of claim 1, further comprising a supply of oil positioned within said pocket, the oil contained within said pocket to absorb said axial force from said main rotor shaft.

4. The system of claim 1, wherein said liner member includes a cylindrical portion and a flange portion extending radially outward from said cylindrical portion, said flange portion fixed to a housing of said electrical machine.

5. The system of claim 1, wherein said shear member has a radial length of between about 0.032 inches and about 0.250 inches.

6. The system of claim 1, wherein said pocket has an axial depth of between about 0.250 inches and about 1.500 inches.

7. The system of claim 1, wherein said liner member comprises a cylindrical portion and an end portion integral to and positioned at one end of said cylindrical portion.

8. The system of claim 1, wherein said shear member comprises an annular plate shaped structure.

9. The system of claim 1, wherein said electrical machine comprises a generator.

10. The system of claim of claim 1, wherein said shear member has an axial thickness of between about 0.010 inches and about 0.100 inches.

11. A system for an electrical machine comprising:
a cylindrical structure;
a shear member extending from an inner diameter surface of said cylindrical structure and towards a main rotor shaft of said electrical machine, said shear member shearing from said cylindrical structure when said shear member is exposed to an axial force from a main rotor shaft;

a pocket adjacent to said shear member;

a supply of pressurized oil positioned within said pocket, the pressurized oil contained within said pocket to absorb an axial force from a main rotor shaft of said electrical machine; and a spring positioned within said pocket.

12. The system of claim 11, wherein said spring comprises a wavy washer spring.

13. The system of claim 11, wherein said shear member has a radial length of between about 0.032 inches and about 0.250 inches.

14. The system of claim 11, wherein said shear member has an axial thickness of between about 0.010 inches and about 0.100 inches.

15. A system for a bearing support assembly comprising:

a cylindrical portion;

an end portion integral to and positioned at one end of said cylindrical portion;

a shear member extending radially inward from said cylindrical portion, said shear member shearing from said cylindrical portion when said shear member is exposed to an axial force from a main rotor shaft;

a pocket defined at least in part by said cylindrical portion, said end portion and said shear member; and a supply of pressurized oil disposed in said pocket the pressurized oil contained within said pocket to absorb an axial force from a main rotor shaft of said electrical machine.

16. The system of claim 15, wherein said a radial length of said shear member is at least about half of a radial width of said bearing assembly.

17. The system of claim 15, further comprising a wavy washer spring positioned within said pocket.

18. The system of claim 15, wherein said bearing support assembly comprises an anti-drive bearing support assembly for a high speed aerospace generator.

19. The system of claim 15, wherein said shear member is integral to said cylindrical portion.

* * * * *